United States Patent
Cho

(10) Patent No.: US 8,847,981 B2
(45) Date of Patent: Sep. 30, 2014

(54) METHOD AND APPARATUS FOR ACCUMULATIVE VECTOR DRAWING USING BUFFERING

(75) Inventor: Sung-hee Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1689 days.

(21) Appl. No.: 11/264,031

(22) Filed: Nov. 2, 2005

(65) Prior Publication Data

US 2006/0109275 A1 May 25, 2006

(30) Foreign Application Priority Data

Nov. 2, 2004 (KR) .................. 10-2004-0088408

(51) Int. Cl.
*G09G 5/00* (2006.01)
*G06T 11/60* (2006.01)
*G06T 15/40* (2011.01)
*G06T 1/60* (2006.01)
*G09G 5/24* (2006.01)

(52) U.S. Cl.
CPC . *G06T 15/40* (2013.01); *G06T 1/60* (2013.01); *G06T 11/60* (2013.01); *G09G 5/24* (2013.01)
USPC ........... 345/620; 345/624; 345/421; 345/418; 345/539; 345/562; 345/629; 345/522; 345/440; 345/441; 345/427

(58) Field of Classification Search
CPC ........... G06T 11/60; G06T 1/60; G06T 15/40; G09G 5/24
USPC .................. 345/621–629, 418–421, 539, 562
See application file for complete search history.

(56) References Cited

U.S. PATENT DOCUMENTS

| | | | | |
|---|---|---|---|---|
| 5,321,810 A * | 6/1994 | Case et al. | ..................... | 345/562 |
| 5,600,768 A * | 2/1997 | Andresen | ...................... | 345/629 |
| 5,666,474 A * | 9/1997 | Otto | .............................. | 345/421 |
| 5,870,097 A * | 2/1999 | Snyder et al. | ................. | 345/426 |
| 5,903,272 A * | 5/1999 | Otto | .............................. | 345/421 |
| 6,005,586 A | 12/1999 | Morita et al. | | |
| 6,262,746 B1 * | 7/2001 | Collins | ........................ | 345/629 |
| 6,266,064 B1 * | 7/2001 | Snyder | .......................... | 345/421 |
| 6,304,271 B1 * | 10/2001 | Nehme | ......................... | 345/620 |
| 6,326,964 B1 * | 12/2001 | Snyder et al. | ................. | 345/419 |
| 6,466,229 B1 * | 10/2002 | Nagao | ............................ | 345/621 |
| 6,771,269 B1 * | 8/2004 | Radecki et al. | ............... | 345/503 |
| 2002/0101428 A1 * | 8/2002 | Hsiao et al. | .................. | 345/539 |
| 2004/0075654 A1 * | 4/2004 | Hsiao et al. | .................. | 345/418 |

FOREIGN PATENT DOCUMENTS

| | | |
|---|---|---|
| JP | 4-262472 A | 9/1992 |
| JP | 6-168339 A | 6/1994 |

* cited by examiner

*Primary Examiner* — Jin-Cheng Wang
(74) *Attorney, Agent, or Firm* — Sughrue Mion, PLLC

(57) ABSTRACT

A method and apparatus for accumulative vector drawing are provided. The method includes receiving a graphics command, accumulating the graphics command, and rendering the graphics command in an order reverse to an order in which the graphics command was stored, and when the graphics command is a valid definite drawing command, calculating a clipping area of the valid definite drawing command and reflecting the clipping area when rendering graphics commands rendered after the valid definite drawing command.

21 Claims, 8 Drawing Sheets

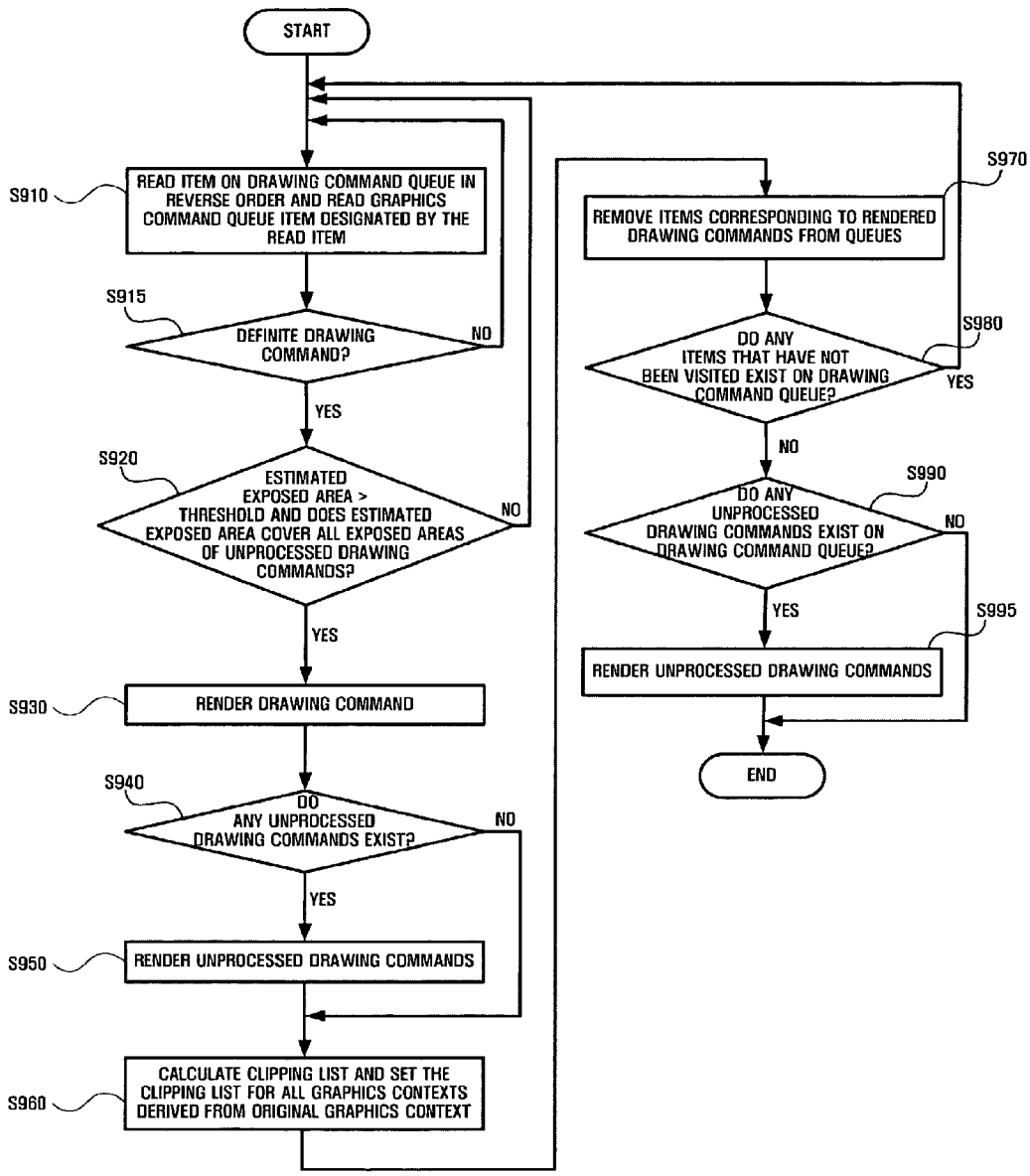

METHOD AND APPARATUS FOR ACCUMULATIVE VECTOR DRAWING USING BUFFERING

CROSS-REFERENCE TO RELATED APPLICATION

This application claims priority from Korean Patent Application No. 10-2004-0088408 filed on Nov. 2, 2004 in the Korean Intellectual Property Office, the disclosure of which is incorporated herein by reference in its entirety.

BACKGROUND OF THE INVENTION

1. Field of the Invention

The present invention relates to a method and apparatus for accumulative vector drawing, and more particularly, to a method and apparatus for accumulative vector drawing, by which graphics commands are accumulated and rendered in reverse order and during the reverse order rendering, a part of a lower drawing command overlapping with an upper drawing command is not rendered, thereby increasing the speed of executing a drawing command.

2. Description of the Related Art

In a structure such as a windows system in which a picture is drawn by accumulating various figures, a graphics system displays a window, in which figures having a quadrangular shape or other diverse shapes overlap with one another, and iteratively draws an overlapping area between the figures whenever each figure is drawn.

FIG. 1 is a diagram of a conventional display system.

To output a graphics command to a display apparatus, the display system includes a graphics system unit 110, a video unit 120, and a display unit 130, as shown in FIG. 1. A user draws a figure on the display unit 130 using a graphics command interface 111 included in the graphics system unit 110. In addition, the user can set graphics attributes, e.g., color and line thickness, applied to the figure. A data structure that stores the values of these graphics attributes is referred to as a graphics context. The graphics system unit 110 includes a graphics context section 112 managing at least one graphics context. The graphics system unit 110 and the video unit 120 can exchange data with each other directly or by mapping a main memory or the like. A graphics processor 121 included in the video unit 120 converts data received from the graphics system unit 110 and moves the data to a video memory 122. As a result, a graphics command input by the user is stored in the video memory 122 in the form of byte stream information and is transmitted to and displayed on the display unit 130.

FIG. 2 is a flowchart of the fundamental operations of the conventional display system shown in FIG. 1.

Specifically, FIG. 2 illustrates the operations of the graphics system unit 110 included in the conventional display system. Graphics commands are largely divided into drawing commands and attribute setting commands. The graphics system unit 110 determines whether an input graphics command is a drawing command in operation S210. If it is determined that it is a drawing command, the graphics system unit 110 converts drawing vector information into pixel-based scalar information and outputs the pixel-based scalar information to the video unit 120 by storing it in the video memory 122 in operation S220. Meanwhile, if the graphics command is an attribute setting command, the graphics system unit 110 sets an attribute value in the graphics context section 112 in operation S230.

When the conventional technology illustrated in FIGS. 1 and 2 is used in a structure such as a windows system in which a picture is drawn by accumulating figures, an area of a figure that is superimposed on by another figure drawn later and is thus not shown is unnecessarily drawn. When drawing vector information input through the graphics command interface 111 to draw a figure is converted into pixel-based scalar information, all pixels in the figure must be calculated, and such rendering process takes most of the operating time of the graphics system unit 110. In addition, drawing a figure over another figure may cause flickering.

Inventions for solving these problems are disclosed in many patents. For example, U.S. Pat. No. 4,907,174 discloses a method of clipping an overlapping area between windows by using a Z-buffer algorithm in a graphics system having multiple windows.

However, since these inventions do not provide a function that eliminates unnecessary drawing or require complex calculations and expensive hardware, these are not satisfactory enough to solve the problem of delay in executing a graphics command.

SUMMARY OF THE INVENTION

The present invention provides a method and apparatus for accumulative vector drawing by which an area of a lower figure that is covered with a higher figure is not drawn when a picture is drawn by accumulating figures, thereby increasing a rendering speed.

The present invention also provides a method and apparatus for accumulative vector drawing that can be used even in a system that does not have a complex function like Z-buffering.

The above stated aspects as well as other aspects, features and advantages of the present invention will become clear to those skilled in the art upon review of the following description.

According to an aspect of the present invention, there is provided a method for accumulative vector drawing using buffering, including receiving a graphics command; accumulating the graphics command; and rendering the graphics command in an order reverse to an order in which the graphics command was stored, and when the graphics command is a valid definite drawing command, calculating a clipping area of the valid definite drawing command and reflecting the clipping area when rendering graphics commands rendered after the valid definite drawing command.

According to an aspect of the present invention, there is provided an apparatus for accumulative vector drawing using buffering, the apparatus including a graphics system unit receiving a graphics command, a video unit drawing the graphics command, and an accumulative vector drawing system unit accumulating graphics commands, rendering the graphics commands to the video unit in an order reverse to an order in which the graphics commands were stored, and when a graphics command is a valid definite drawing command, calculating a clipping area of the valid definite drawing command and reflecting the clipping area when rendering graphics commands rendered after the valid definite drawing command.

BRIEF DESCRIPTION OF THE DRAWINGS

The above and other features and advantages of the present invention will become more apparent by describing in detail preferred embodiments thereof with reference to the attached drawings in which:

FIG. 9 is a flowchart of a procedure for emptying the graphics command buffer of accumulated graphics commands in the drawing method shown in FIG. 7.

DETAILED DESCRIPTION OF THE INVENTION

Figure 1:
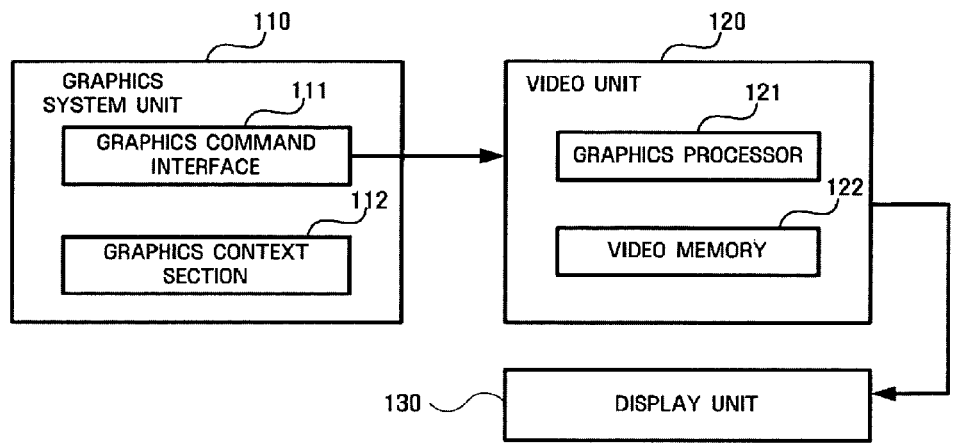
FIG. 1 illustrates a conventional display system.
Figure 2:
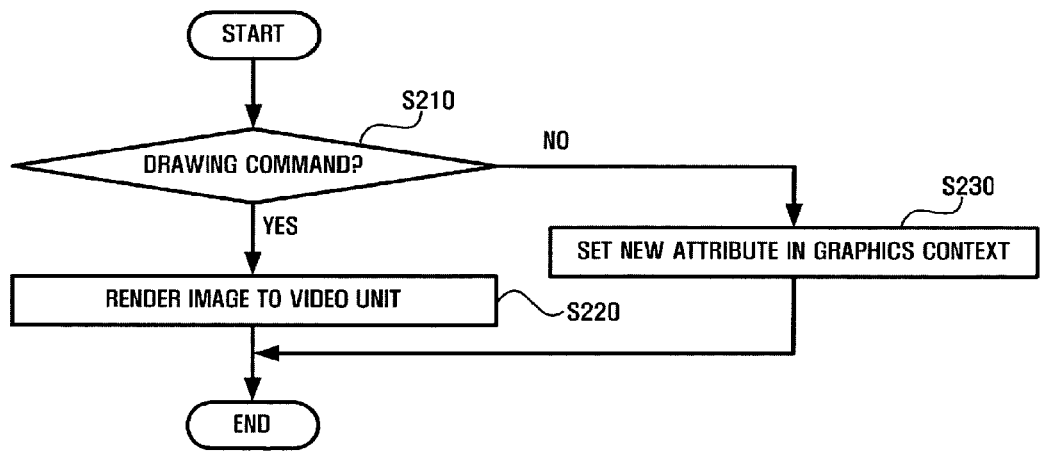
FIG. 2 is a flowchart of the fundamental operations of the display system shown in FIG. 1.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 3:
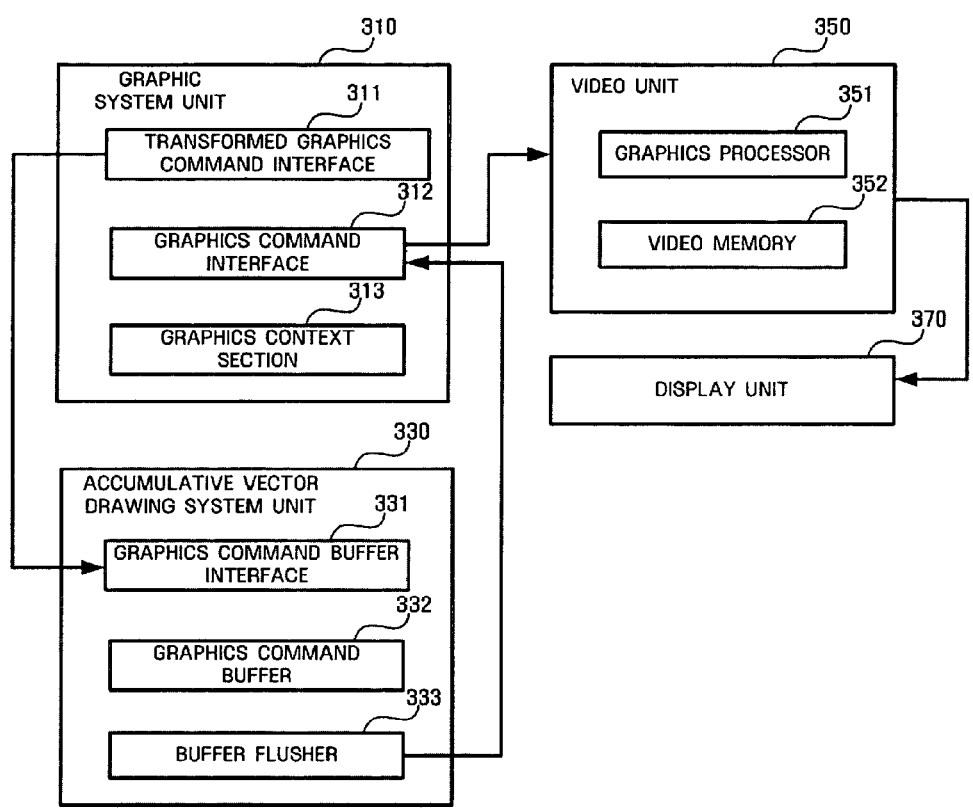
FIG. 3 is a block diagram of a drawing apparatus according to an embodiment of the present invention.

FIG. 3 is a block diagram of a drawing apparatus according to an embodiment of the present invention.

The drawing apparatus includes a graphics system unit 310, an accumulative vector drawing system unit 330, a video unit 350, and a display unit 370.

The graphics system unit 310 has the same structure as the graphics system unit 110 shown in FIG. 1, with the exception that it further includes a transformed graphics command interface 311. The transformed graphics command interface 311 transfers a graphics command input from a user to the accumulative vector drawing system unit 330.

The accumulative vector drawing system unit 330 accumulates graphics commands input from the user via the graphics system unit 310 for a predetermined period of time and includes a graphics command buffer interface 331, a graphics command buffer 332, and a buffer flusher 333. The graphics command buffer interface 331 provides interface for storing a user's graphics command received from the transformed graphics command interface 311 of the graphics system unit 310 in the graphics command buffer 332. The buffer flusher 333 periodically or conditionally executes a graphics command stored in the graphics command buffer 332. The graphics command buffer 332 stores the user's graphics command in a form of vector information. The data structure of the graphics command buffer 332 will be described with reference to FIG. 5 later.

The video unit 350 and the display unit 370 are the same as the video unit 120 and the display unit 130 shown in FIG. 1. However, in the embodiment illustrated in FIG. 3, if the execution of a graphics command is requested by the user, instead of directly rendering the graphics command to the video memory 122 in the conventional technology, the graphics command is stored in the graphics command buffer 332 in the form of vector information through the transformed graphics command interface 311 and the graphics command buffer interface 331 and is then periodically or conditionally rendered in normal order in which the graphics command was stored or in reverse order through the buffer flusher 333 and a graphics command interface 312 in order to reduce the redundant execution of overlapping drawing commands. A drawing method according to an embodiment of the present invention will be described with reference to FIGS. 7 through 9 later.

Figure 4:
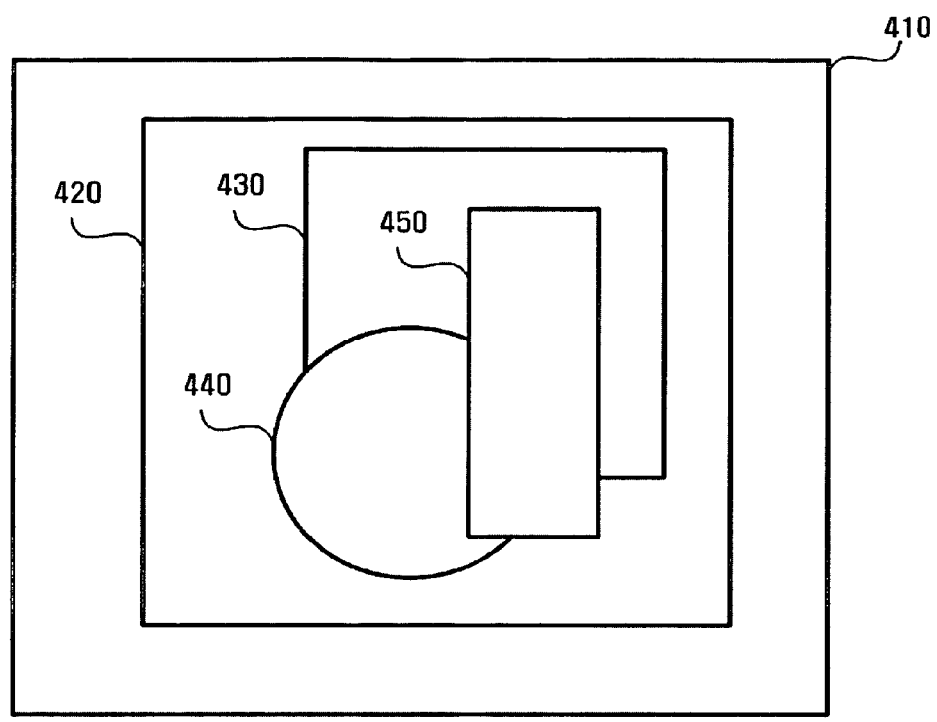
FIG. 4 illustrates drawing commands.

FIG. 4 illustrates examples of drawing commands input to the graphics system unit 310.

Here, the drawing commands are divided into definite drawing commands and indefinite drawing commands. An area drawn under a figure drawn according to each of a definite drawing command can be definitely clipped. For example, the commands 420 and 450 for drawing opaque quadrangles may be definite drawing commands. An indefinite drawing command is for the execution of drawing with reflection of a drawing command for an underlying figure. For example, a command 430 for drawing a semitransparent quadrangle and a command 440 for drawing a figure having a shape that is not supported with clipping by the graphics system unit 310 may be indefinite drawing commands. A semitransparent quadrangle must be blended with an underlying figure drawn according to a lower drawing command and thus corresponds to an indefinite drawing command. In an embodiment of the present invention, it is assumed that figures other than a quadrangle are not supported with clipping, and therefore, the command 440 for drawing a circle is defined as the indefinite drawing command. However, this characteristic may be different according to the performance of the graphics system unit 310.

Definite drawing commands may be divided into valid definite drawing commands and invalid definite drawing commands. For this division, an increment of a rendering speed due to clipping is compared with time taken to calculate a clipping list. When the calculating of the clipping list takes too much time as compared to the increment of the rendering speed, a corresponding drawing command is defined as an invalid definite drawing command and is dealt with as an indefinite drawing command. Accordingly, if the speed of a drawing apparatus calculating a clipping list is slow, a drawing command for a bigger quadrangle may be defined as a valid definite drawing command.

To draw a picture shown in FIG. 4 according to an embodiment of the present invention, the drawing commands 420, 430, 440, and 450 respectively drawing an opaque quadrangle, a semitransparent quadrangle, an opaque circle, and an opaque quadrangle are sequentially stored as vector commands for a single window 410 in the graphics command buffer 332. The buffer flusher 333 operates periodically or when an estimated total drawing time for the figures stored in the graphics command buffer 332 exceeds a buffer emptying interval, and the figures are rendered in order reverse to an order in which graphics commands are input. First, the opaque quadrangle drawn by the drawing command 450 is rendered and a clipping list is set. Rendering of the indefinite drawing commands 430 and 440 respectively drawing the semitransparent quadrangle and the opaque circle is reserved. The subsequent definite drawing command 420 drawing the opaque quadrangle covers all the exposed areas of the unprocessed drawing commands 430 and 440 and is thus rendered. Next, the unprocessed drawing commands 430 and 440 are rendered in the order in which they were input. Next, a clipping list for the opaque quadrangle drawn by the drawing command 420 is set. Since there is no drawing command to be executed, an image rendered on the window 410 is output and the buffer flusher 333 terminates the operation.

Figure 5:
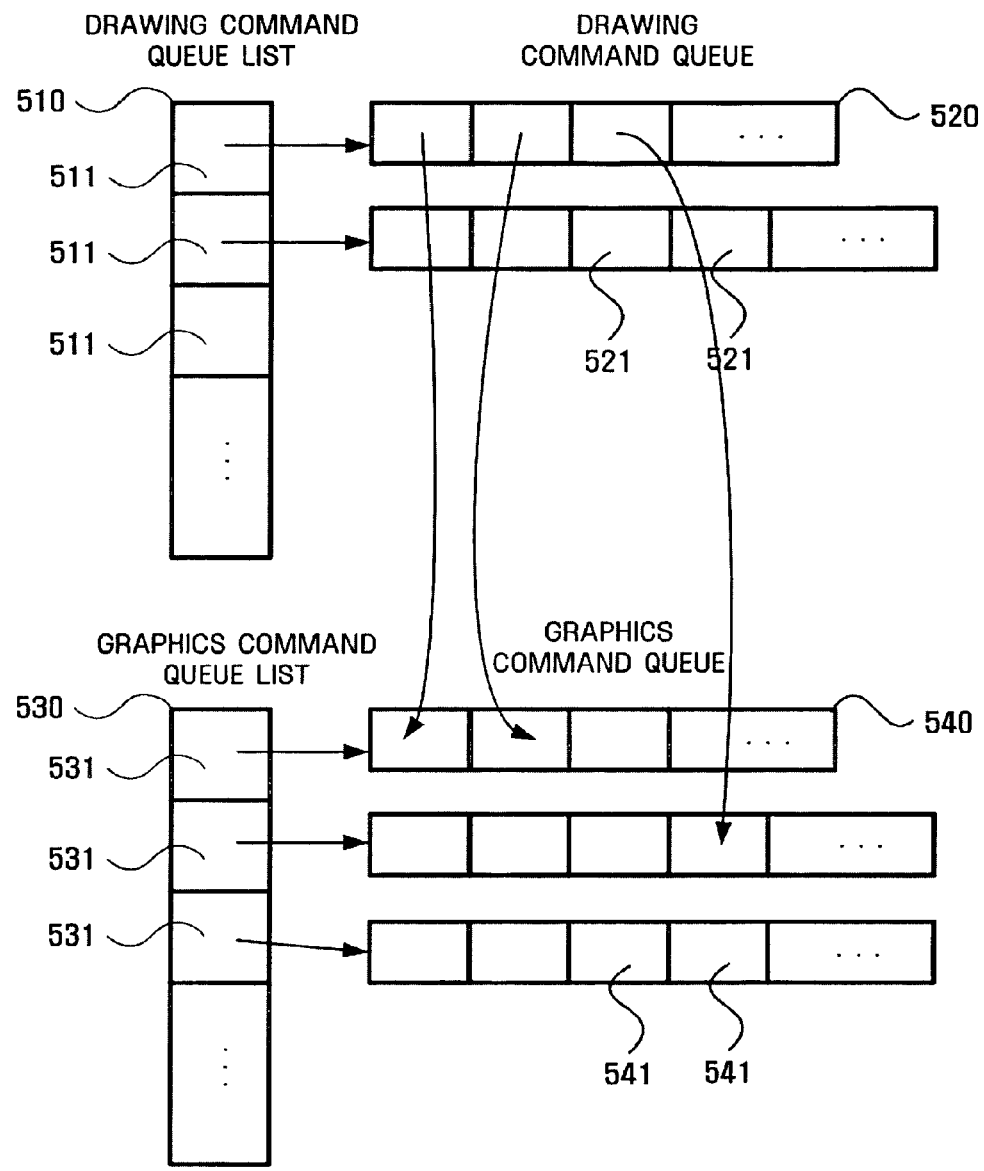
FIG. 5 is a detailed diagram of an accumulative vector drawing system unit shown in FIG. 3.

FIG. 5 is a detailed diagram of the accumulative vector drawing system unit 330 shown in FIG. 3.

In detail, FIG. 5 illustrates the data structure of the graphics command buffer 332 included in the accumulative vector drawing system unit 330. In a windows system, a single window permits a plurality of graphics contexts having different attribute values. Accordingly, a drawing command may be related with multiple graphics contexts in a single window. In other words, the drawing command executed on the multiple graphics contexts is eventually executed on the single window and drawings are executed in the temporal order in which the drawings are input. However, an attribute setting command is independent between graphics contexts. An attribute value set for one graphic context influences drawing only on the graphics context.

In a drawing apparatus according to an embodiment of the present invention, a drawing command queue 520 is used to sequentially store drawing commands of each window. To support multiple windows, a drawing command queue list 510 is defined to declare a plurality of drawing command queues 520. Items 511 on the drawing command queue list 510 (referred to as drawing command queue list items 511) indicate the drawing command queues 520, respectively. Meanwhile, a graphics command queue 540 is used to store a graphics command including a drawing command and an attribute setting command for a single graphics context. To support multiple graphics contexts, a graphics command queue list 530 is defined to declare a plurality of graphics command queues 540. Items 531 on the graphics command queue list 530 (referred to as graphics command queue list items 531) indicate graphics command queues 540, respectively. In an embodiment of the present invention, instead of including information regarding a relevant drawing command, an item 521 on a drawing command queue 520 (referred to as a drawing command queue item 521) includes pointer information designating an item 541 on a graphics command queue 540 (referred to as a graphics command queue item 541) that includes the information regarding the relevant drawing command. Information on an actual drawing command and information on an actual attribute setting command are stored in graphics command queue items 541.

Figure 6:
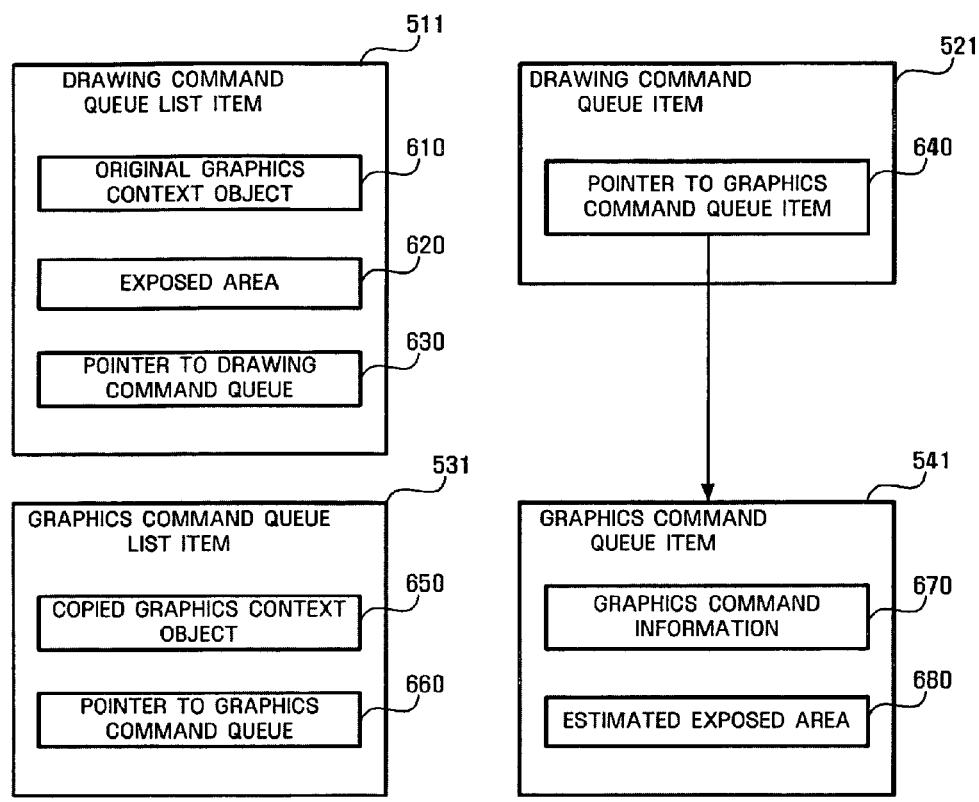
FIG. 6 illustrates the detailed data structure of items on queues shown in FIG. 5.

FIG. 6 illustrates the detailed data structure of the items 511, 521, 531, and 541 shown in FIG. 5.

The drawing command queue list item 511 includes an original graphics context object 610 of a window, an exposed area 620 indicating an area occupied by a rendered drawing command, and a pointer 630 designating a drawing command queue. The exposed area 620 includes the coordinates of a newly changed area on a display unit. The drawing command queue item 521 includes a pointer 640 designating the graphics command queue item 541 including information regarding a relevant drawing command.

The graphics command queue list items 531 includes a copied graphics context object 650 of an original graphics context of the window and a pointer 660 designating a graphics command queue. The graphics command queue item 541 includes graphics command information 670 and an estimated exposed area 680 including information regarding an area occupied by the graphics command when the graphics command is a drawing command. The graphics command information 670 includes information expressing a graphics command in a vector form, information indicating whether the graphics command is a definite drawing command, etc.

The estimated exposed area 680 is used to determine whether the graphics command is a valid definite drawing command and to calculate a clipping area.

Figure 7:
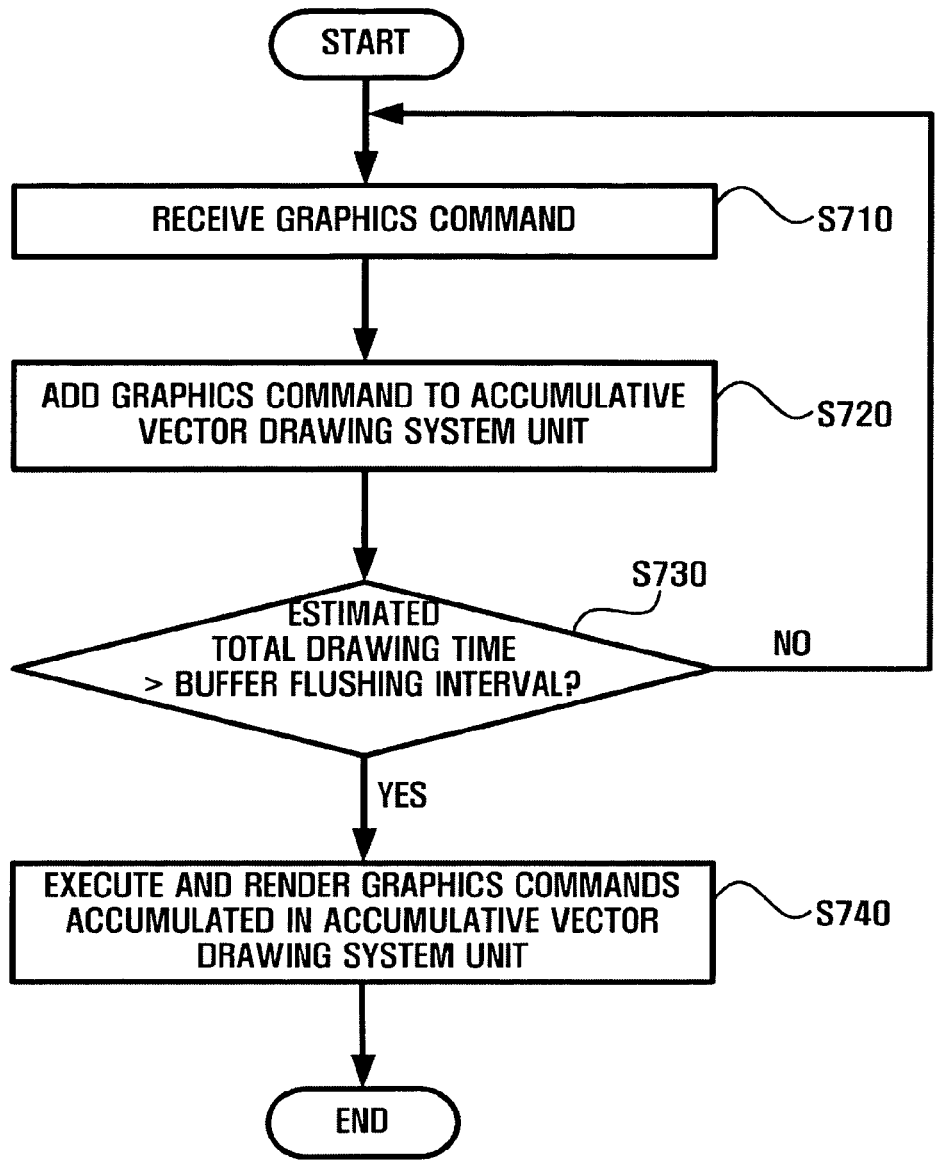
FIG. 7 is a flowchart of a drawing method according to an embodiment of the present invention.

FIG. 7 is a flowchart of a drawing method according to an embodiment of the present invention.

The transformed graphics command interface 311 included in the graphics system unit 310 receives a graphics command from a user in operation S710 and adds the graphics command to the accumulative vector drawing system unit 330 in operation S720. When an estimated total drawing time exceeds a buffer emptying interval in operation S730, graphics commands accumulated in the accumulative vector drawing system unit 330 are executed and rendered to the video unit 350 in operation S740.

In operation 720, the graphics command buffer interface 331 included in the accumulative vector drawing system unit 330 receives the graphics command from the transformed graphics command interface 311 included in the graphics system unit 310 and stores the graphics command in the graphics command buffer 332 in a form of vector information. This operation will be described in detail with reference to FIG. 8 later.

Until the estimated total drawing time for graphics commands stored in the graphics command buffer 332 exceeds the predetermined buffer emptying interval, operations S710 and S720 are repeated. When the estimated total drawing time exceeds the predetermined buffer emptying interval, the buffer flusher 333 included in the accumulative vector drawing system unit 330 forcibly executes the graphics command stored in the graphics command buffer 332 in an order reverse to an order in which they were stored to render the graphics commands in operation S740. In another embodiment of the present invention, the buffer flusher 333 may periodically execute and render the graphics command stored in the graphics command buffer 332 at a predetermined time interval, which is not so long as to give an unnatural appearance. Generally, when rendering and display output is performed at an interval of about 1/30 second, people do not perceive an unnatural visual effect. The buffer emptying interval may be empirically and adaptively determined according to system performance. Operation S740 will be described in detail with reference to FIG. 9 later.

Figure 8:
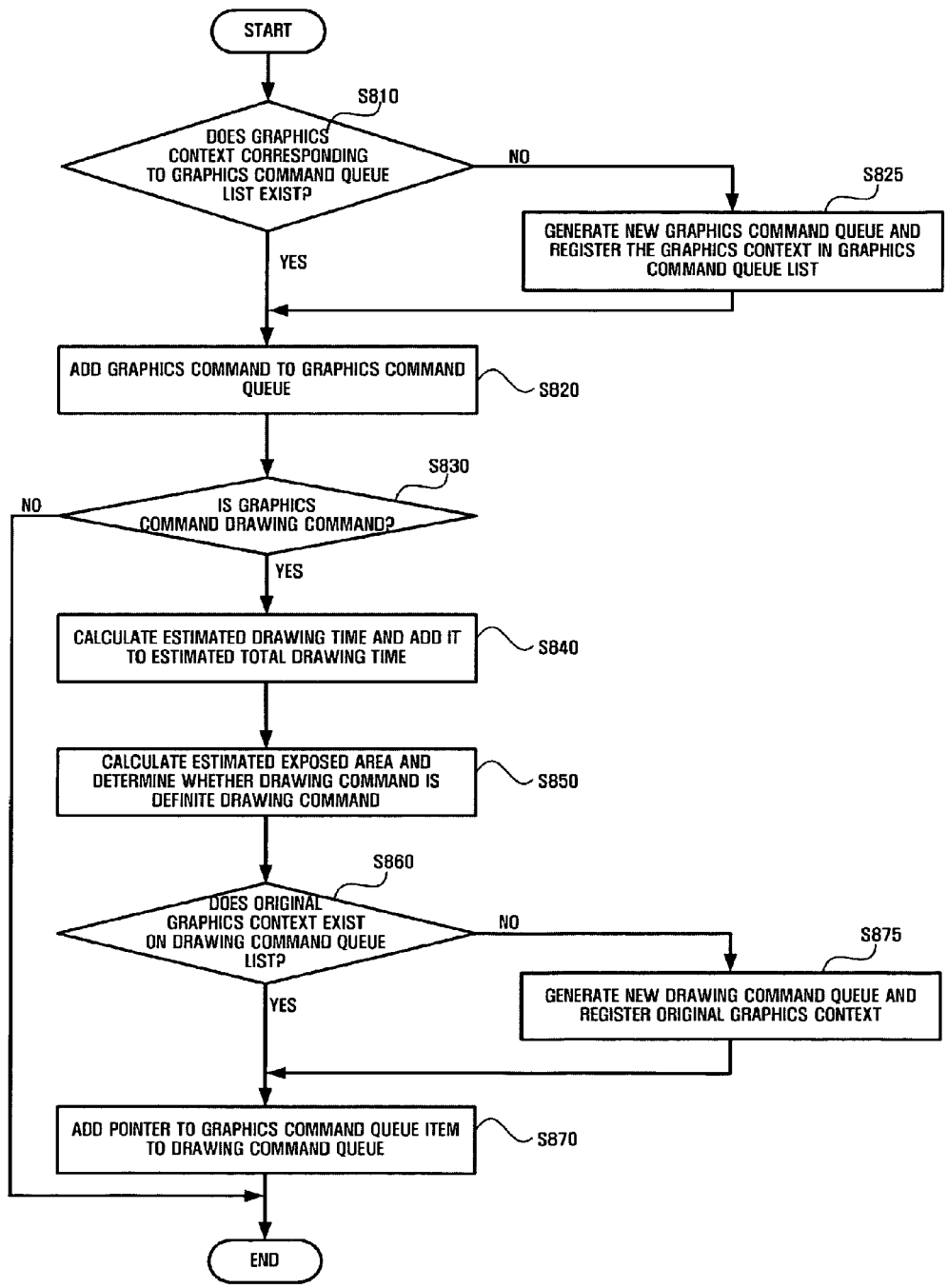
FIG. 8 is a flowchart of a procedure for adding a graphics command to a graphics command buffer in the drawing method shown in FIG. 7.

FIG. 8 is a flowchart of an operation of adding the graphics command to the graphics command buffer 332 in the method shown in FIG. 7.

When a graphics command is input, it is determined whether a graphics context corresponding to the graphics command queue list 530 exists in operation S810. When the graphics context exists, the graphics command is added to a graphics command queue 540 designated by the graphics command queue list items 531 including the graphics context in operation S820. However, when the graphics context does not exist, a new graphics command queue is generated, the graphics command is added to the new graphics command queue, and the graphics context and a pointer to the new graphics command queue are registered in the graphics command queue list 530.

When it is determined that the graphics command is a drawing command in operation S830, an estimated drawing time for the drawing command is calculated and is added to the estimated total drawing time in operation S840. In operation S850, an estimated exposed area of the drawing command is calculated and it is determined whether the drawing command is a definite drawing command.

In operation S860, it is determined whether an original graphics context related with the drawing command exists on the drawing command queue list 510. If it is determined that the original graphics context exists, in operation S870 a pointer to a graphics command queue item 541 including information regarding the drawing command is added to a drawing command queue 520 designated by a drawing command queue list item 511 corresponding to the original graphics context. However, if it is determined that the original graphics context does not exist on the drawing command queue list 510, in operation S875 a new drawing command queue is generated, the pointer to the graphics command queue item 541 including the information regarding the drawing command is added to the new drawing command queue, and a pointer to the new drawing command queue and the original graphics context are registered in the drawing command queue list 510.

FIG. 9 is a flowchart of an operation of emptying the graphics command buffer 332 of the accumulated graphics commands in the method shown in FIG. 7.

In operation S910, the buffer flusher 333 reads an item 521 on a drawing command queue 520 in an order reverse to an order in which items 521 on the drawing command queue 520 were stored and reads a graphics command queue item 541 designated by the read item 521. If it is determined that a drawing command corresponding to the item 521 is not a definite drawing command in operation S915, the drawing command is skipped and a subsequent item 521 in the reverse order is read in operation S910.

However, if it is determined that the drawing command is the definite drawing command in operation S915, it is determined whether the drawing command is a valid definite drawing command in operation S920. If it is determined that the drawing command is not the valid definite drawing command, the drawing command is skipped and the subsequent item 521 in the reverse order is read in operation S910. If it is determined that the drawing command is the valid definite drawing command, the drawing command is rendered to the video unit 350 through the graphics command interface 312 of the graphics system unit 310 in operation S930. If it is determined that any unprocessed drawing commands exist among drawing commands stored temporally after the rendered drawing command in operation S940, then in operation S950 they are rendered to the video unit 350 in the order in which they were stored. In operation S960, a clipping list for the rendered valid definite drawing command is calculated and is set for all graphics contexts derived from an original graphics context related with the rendered valid definite drawing command. In operation S970, all items 521 and 541 corresponding to the rendered drawing commands are removed from the drawing command queue 520 and the graphics command queue 540. If it is determined that any items 521 that have not been visited exist on the drawing command queue 520 in operation S980, operations S910 through S970 are repeated. If it is determined that every item 521 on the drawing command queue 520 has been visited, any unprocessed commands among the visited drawing commands are rendered in operations S990 and S995, and the operation of emptying the graphics command buffer 332 ends.

In operation S920, determining whether the definite drawing command is the valid definite drawing command is performed by determining whether the definite drawing command satisfies conditions of the valid definite drawing command. In detail, it is determined whether an estimated exposed area of the definite drawing command exceeds a predetermined threshold. If it is determined that the estimated exposed area exceeds the predetermined threshold, it is determined whether the estimated exposed area covers all of the exposed areas of unprocessed drawing commands stored temporally after the definite drawing command. The predetermined threshold may be adaptively determined according to the speed of a drawing apparatus calculating a clipping list, as described with reference to FIG. 4 above.

In operations S930, S950, and S995 of rendering a drawing command, among commands on the graphics command queue 540, an attribute setting command needed to execute the drawing command is executed to set an attribute value for a corresponding graphics context and then the drawing command is rendered. In another embodiment of the present invention, attribute setting information needed to execute a drawing command may be kept as information regarding the drawing command so that searching the graphics command queue 540 for an attribute setting command may be eliminated when the drawing command is executed.

The method and apparatus for accumulative vector drawing using buffering according to the present invention provides at least the following advantages.

First, an area of a lower figure that is covered with a higher figure is not drawn when a picture is drawn by accumulating figures, thereby increasing a rendering speed.

Second, even in a system that does not have a complex function like Z-buffering, an area of a lower figure that is covered with a higher figure is not drawn using a simple method when a picture is drawn by accumulating figures.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A method for accumulative vector drawing using buffering, implemented by an apparatus for the accumulative vector drawing using the buffering, the method comprising:
   receiving a plurality of graphics commands;
   sequentially storing the plurality of graphics commands in a buffer;
   determining a valid definite drawing command that is temporally stored most recently in the buffer among the plurality of graphics commands;
   rendering, by a video unit having a graphics processor and a memory, the valid definite drawing command on a display, calculating a clipping area of the valid definite drawing command and reflecting the clipping area when rendering unrendered graphics commands, among the plurality of graphics commands, that are temporally stored in the buffer after the valid definite drawing command; and
   sequentially rendering the unrendered graphics commands temporally stored in the buffer after the valid definite drawing command on the display in an order in which the unrendered graphics commands temporally stored in the buffer after the valid definite drawing command were stored in the buffer,
   wherein the determining the valid definite drawing command comprises:
      determining whether an estimated exposed area of one of the plurality of graphics commands exceeds a predetermined threshold;
      if the estimated exposed area of the one of the plurality of graphics commands exceeds the predetermined threshold, determining whether the estimated exposed area covers all exposed areas of unrendered graphics commands temporally stored in the buffer after the one of the plurality of graphics commands; and if the estimated exposed area covers all exposed areas of the unrendered graphics commands temporally stored in the buffer after the one of the plurality of graphics commands, determining that the one of the plurality of graphics commands is the valid definite drawing command, and wherein the valid definite drawing command is a drawing command that definitely clips an area drawn under a figure drawn.

2. The method of claim 1, wherein the storing of the graphics commands comprises:

adding information regarding each of the plurality of graphics commands to a graphics command queue; and if a graphics command among the plurality of graphics commands is a drawing command, adding information regarding the drawing command to a drawing command queue.

3. The method of claim 2, wherein the adding of the information regarding the graphics commands comprises:

adding the information regarding each of the plurality of graphics commands to the graphics command queue; and if a graphics command among the plurality of graphics commands is a drawing command, calculating an estimated exposed area of the drawing command and determining whether the drawing command is a definite drawing command.

4. The method of claim 3, wherein the adding of the information regarding the graphics commands further comprises calculating an estimated drawing time for the drawing command and adding the estimated drawing time to an estimated total drawing time.

5. The method of claim 2, wherein the information regarding the graphics commands comprises information indicating whether the graphics command is the drawing command, information expressing the graphics command in a vector form, and information indicating whether the graphics command is a valid definite drawing command.

6. The method of claim 2, wherein the information regarding the drawing command is a pointer to an item corresponding to the drawing command on the graphics command queue.

7. The method of claim 1, wherein the rendering of the graphics commands is repeated at a predetermined interval.

8. The method of claim 1, wherein the rendering of the graphics commands is performed when an estimated total drawing time for drawing commands stored in the buffer exceeds a predetermined buffer emptying interval.

9. The method of claim 1, wherein the determining of the graphics command further comprises:

reading the plurality of graphics commands in the reverse order from the buffer.

10. The method of claim 1, wherein the predetermined threshold is based on a calculating speed of an apparatus that calculates a clipping list based on the graphics command, and wherein the exposed area of the graphics command comprises coordinates of a newly changed area on a display unit occupied by the graphics command.

11. The method of claim 1, wherein the unrendered graphics commands temporally stored in the buffer after the valid definite drawing command comprise graphics commands among the plurality of graphics commands that have not been rendered and that are determined not to be valid definite drawing commands.

12. The method of claim 1, further comprising:

determining a second valid definite drawing command that is temporally stored before the valid definite drawing command in the buffer among the plurality of graphics commands;

rendering the second valid definite drawing command after rendering the unrendered graphics commands temporally stored in the buffer after the valid definite drawing command.

13. An apparatus for accumulative vector drawing using buffering, the apparatus comprising:

a graphics system unit which receives a graphics command;

a video unit which draws the graphics command; and an accumulative vector drawing system unit which accumulates graphics commands in a buffer and which determines a valid definite drawing command that is temporally accumulated most recently in the buffer among the accumulated graphics commands, renders the valid definite drawing command to the video unit, calculates a clipping area of the valid definite drawing command, and reflects the clipping area when rendering unrendered graphics commands, among the accumulated graphics commands, that are temporally accumulated in the buffer after the valid definite drawing command, wherein remaining the unrendered graphics commands temporally accumulated in the buffer after the valid definite drawing command are sequentially rendered to the video unit in an order in which the unrendered graphics commands temporally accumulated in the buffer after the valid definite drawing command were received by the graphics system unit, wherein the determining the valid definite drawing command by the accumulative vector drawing system comprises:

determining whether an estimated exposed area of the graphics command exceeds a predetermined threshold;

if the estimated exposed area exceeds the predetermined threshold, determining whether the estimated exposed area covers all exposed areas of unrendered graphics commands temporally received by the graphics system unit after the graphics command; and if the estimated exposed area covers all exposed areas of the unrendered graphics commands temporally received by the graphics system unit after the graphics command, determining that the graphic command is the valid definite drawing command, and wherein the valid definite drawing command is a drawing command that definitely clips an area drawn under a figure drawn.

14. The apparatus of claim 13, wherein the graphics system unit comprises:

a transformed graphics command interface receiving the graphics command and transmitting the graphics command to the accumulative vector drawing system unit;

a graphics context section managing a graphics context related with the graphics command; and a graphics command interface rendering a graphics command received from the accumulative vector drawing system unit to the video unit.

15. The apparatus of claim 13, wherein the accumulative vector drawing system unit comprises:

a graphics command buffer storing the graphics commands;

a graphics command buffer interface providing interface for storing the graphics command received from the graphics system unit in the graphics command buffer; and a buffer flusher executing a graphics command stored in the graphics command buffer.

16. The apparatus of claim 15, wherein the graphics command buffer comprises:

a graphics command queue managing the graphics commands in an order in which the graphics commands were received for a relevant graphics context; and a drawing command queue managing information regarding a drawing command among the graphics command for a window.

17. The apparatus of claim 16, wherein the graphics command queue comprises:

information regarding each graphics command; and information regarding an estimated exposed area of each graphics command.

18. The apparatus of claim 16, wherein the drawing command queue comprises a pointer to an item that stores a relevant drawing command on the graphics command queue.

19. The apparatus of claim 15, wherein the buffer flusher executes a graphics command stored in the graphics command buffer in a predetermined interval.

20. The apparatus of claim 15, wherein the buffer flusher executes a graphics command stored in the graphics command buffer when an estimated total drawing time for the figures stored in the graphics command buffer exceeds a predetermined buffer emptying interval.

21. A method for accumulative vector drawing using buffering, implemented by an apparatus for the accumulative vector drawing using the buffering, the method comprising:

receiving a plurality of graphics commands;

sequentially storing the plurality of graphics commands in a buffer;

determining, for each of the plurality of the graphics commands stored in the buffer, whether each of the plurality of the graphics commands is a valid definite drawing command;

rendering, by a video unit having a graphics processor and a memory, in an order reverse to an order in which the plurality of the graphics commands were stored in the buffer, the graphics commands among the plurality of the graphics commands that are determined to be a valid definite drawing command and calculating a clipping area of each of the graphics commands among the plurality of the graphics commands that are determined to be a valid definite drawing command; and rendering after rendering each of the valid definite drawing commands, in an order in which the plurality of the graphics commands were stored in the buffer, the unrendered graphics commands among the plurality of the graphics commands that are not determined to be a valid definite drawing command and that are temporally stored in the buffer after each of the valid definite drawing commands and reflecting the clipping area when rendering each of the graphics commands among the plurality of the graphics commands that are not determined to be a valid definite drawing command, wherein determining comprises:

determining whether an estimated exposed area of the graphics command exceeds a predetermined threshold;

if the estimated exposed area of the graphics command exceeds the predetermined threshold, determining whether the estimated exposed area covers all exposed areas of unrendered graphics commands temporally stored in the buffer after the graphics command; and if the estimated exposed area covers all the exposed areas of the unrendered graphics commands temporally stored in the buffer after the graphics command, determining that the graphics command is a valid definite drawing command, and wherein the valid definite drawing command is a drawing command that definitely clips an area drawn under a figure drawn.

\* \* \* \* \*